United States Patent
Papanikolaou et al.

(10) Patent No.: US 10,422,166 B2
(45) Date of Patent: *Sep. 24, 2019

(54) PIEZO BASED ENERGY HARVESTING FOR E-LATCH SYSTEMS

(71) Applicant: Ford Global Technologies, LLC, Dearborn, MI (US)

(72) Inventors: Kosta Papanikolaou, Huntington Woods, MI (US); Rajesh K. Patel, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 464 days.

This patent is subject to a terminal disclaimer.

(21) Appl. No.: 15/206,957

(22) Filed: Jul. 11, 2016

(65) Prior Publication Data
US 2016/0326779 A1    Nov. 10, 2016

Related U.S. Application Data

(63) Continuation of application No. 14/086,582, filed on Nov. 21, 2013, now Pat. No. 9,416,565.

(51) Int. Cl.
*H02N 2/18*    (2006.01)
*E05B 81/76*    (2014.01)
(Continued)

(52) U.S. Cl.
CPC .............. *E05B 81/77* (2013.01); *B60J 5/00* (2013.01); *E05B 77/28* (2013.01); *E05B 81/04* (2013.01);
(Continued)

(58) Field of Classification Search
CPC .......... E05B 81/78; E05B 81/77; E05B 85/10; E05B 47/0011; E05B 81/76;
(Continued)

(56) References Cited

U.S. PATENT DOCUMENTS

| | | |
|---|---|---|
| 2,229,909 A | 1/1941 | Wread |
| 3,479,767 A | 11/1969 | Gardner et al. |

(Continued)

FOREIGN PATENT DOCUMENTS

| | | |
|---|---|---|
| CN | 1232936 C | 12/2005 |
| CN | 201198681 Y | 2/2009 |

(Continued)

OTHER PUBLICATIONS

Kisteler Instruments, "Force Sensors Ensure Car Door Latch is Within Specification," Article, Jan. 1, 2005, 3 pages.
(Continued)

*Primary Examiner* — Mark A Williams
(74) *Attorney, Agent, or Firm* — Vichit Chea; Price Heneveld LLP

(57) ABSTRACT

A vehicle door includes an electrically-powered latch and a user input feature that can be actuated by a user to cause the electrically-powered latch to unlatch. An electrical energy storage device is operably connected to the electrically-powered latch, and a piezoelectric device is mounted to the door. The piezoelectric device can be manually actuated by a user to charge the electrical energy storage device, and electrical energy from the electrical energy storage device can be utilized to actuate the electrically-powered latch to thereby unlatch the latch. The user input feature may comprise a switch or sensor located adjacent a door handle/latch release on an inside and/or an outside of the vehicle door. The electrical energy storage device may comprise an emergency battery, capacitor, or other electrical device.

11 Claims, 3 Drawing Sheets

(51) Int. Cl.

| | | |
|---|---|---|
| *E05B 81/84* | (2014.01) | |
| *E05B 77/28* | (2014.01) | |
| *E05B 81/04* | (2014.01) | |
| *E05B 81/14* | (2014.01) | |
| *B60J 5/00* | (2006.01) | |
| *E05B 81/56* | (2014.01) | |
| *E05B 81/86* | (2014.01) | |
| *E05B 85/10* | (2014.01) | |

(52) U.S. Cl.
 CPC .............. *E05B 81/14* (2013.01); *E05B 81/56* (2013.01); *E05B 81/76* (2013.01); *E05B 81/84* (2013.01); *E05B 81/86* (2013.01); *E05B 85/10* (2013.01); *H02N 2/186* (2013.01); *Y10T 292/1082* (2015.04)

(58) Field of Classification Search
 CPC .............. E05B 2047/0062; E05B 81/86; E05B 2047/0058; Y10T 29/42; Y10T 307/625
 See application file for complete search history.

(56) References Cited

U.S. PATENT DOCUMENTS

| | | |
|---|---|---|
| 3,751,718 A | 8/1973 | Hanchett |
| 3,854,310 A | 12/1974 | Paull |
| 3,858,922 A | 1/1975 | Yamanaka |
| 4,193,619 A | 3/1980 | Jeril |
| 4,206,491 A | 6/1980 | Ligman et al. |
| 4,425,597 A | 1/1984 | Schramm |
| 4,457,148 A | 7/1984 | Johansson et al. |
| 4,640,050 A | 2/1987 | Yamagishi et al. |
| 4,672,348 A | 6/1987 | Duve |
| 4,674,230 A | 6/1987 | Takeo et al. |
| 4,674,781 A | 6/1987 | Reece et al. |
| 4,702,117 A | 10/1987 | Tsutsumi et al. |
| 4,848,031 A | 6/1989 | Yamagishi et al. |
| 4,858,971 A | 8/1989 | Haag |
| 4,889,373 A | 12/1989 | Ward et al. |
| 4,929,007 A | 5/1990 | Bartczak et al. |
| 5,018,057 A | 5/1991 | Biggs et al. |
| 5,056,343 A | 10/1991 | Kleefeldt et al. |
| 5,058,258 A | 10/1991 | Harvey |
| 5,074,073 A | 12/1991 | Zwebner |
| 5,239,779 A | 8/1993 | Deland et al. |
| 5,263,762 A | 11/1993 | Long et al. |
| 5,297,010 A | 3/1994 | Camarota et al. |
| 5,332,273 A | 7/1994 | Komachi |
| 5,334,969 A | 8/1994 | Abe et al. |
| 5,494,322 A | 2/1996 | Menke |
| 5,497,641 A | 3/1996 | Linde et al. |
| 5,535,608 A | 7/1996 | Brin |
| 5,547,208 A | 8/1996 | Chappell et al. |
| 5,581,230 A | 12/1996 | Barrett |
| 5,583,405 A | 12/1996 | Sai et al. |
| 5,618,068 A | 4/1997 | Mitsui et al. |
| 5,632,120 A | 5/1997 | Shigematsu et al. |
| 5,632,515 A | 5/1997 | Dowling |
| 5,644,869 A | 7/1997 | Buchanan, Jr. |
| 5,653,484 A | 8/1997 | Brackmann et al. |
| 5,662,369 A | 9/1997 | Tsuge |
| 5,684,470 A | 11/1997 | Deland et al. |
| 5,744,874 A | 4/1998 | Yoshida et al. |
| 5,755,059 A | 5/1998 | Schap |
| 5,783,994 A | 7/1998 | Koopman, Jr. et al. |
| 5,802,894 A | 9/1998 | Jahrsetz et al. |
| 5,808,555 A | 9/1998 | Bartel |
| 5,852,944 A | 12/1998 | Collard, Jr. et al. |
| 5,859,417 A | 1/1999 | David |
| 5,896,026 A | 4/1999 | Higgins |
| 5,896,768 A | 4/1999 | Cranick et al. |
| 5,901,991 A | 5/1999 | Hugel et al. |
| 5,921,612 A | 7/1999 | Mizuki et al. |
| 5,927,794 A | 7/1999 | Mobius |
| 5,964,487 A | 10/1999 | Shamblin |
| 5,979,754 A | 11/1999 | Martin et al. |
| 5,992,194 A | 11/1999 | Baukholt et al. |
| 6,000,257 A | 12/1999 | Thomas |
| 6,027,148 A | 2/2000 | Shoemaker |
| 6,038,895 A | 3/2000 | Menke et al. |
| 6,042,159 A | 3/2000 | Spitzley et al. |
| 6,043,735 A | 3/2000 | Barrett |
| 6,050,117 A | 4/2000 | Weyerstall |
| 6,056,076 A | 5/2000 | Bartel et al. |
| 6,065,316 A | 5/2000 | Sato et al. |
| 6,072,403 A | 6/2000 | Iwasaki et al. |
| 6,075,294 A | 6/2000 | Van den Boom et al. |
| 6,089,626 A | 7/2000 | Shoemaker |
| 6,091,162 A | 7/2000 | Williams, Jr. et al. |
| 6,099,048 A | 8/2000 | Salmon et al. |
| 6,125,583 A | 10/2000 | Murray et al. |
| 6,130,614 A | 10/2000 | Miller |
| 5,145,918 A | 11/2000 | Wilbanks, II |
| 6,157,090 A | 12/2000 | Vogel |
| 6,181,024 B1 | 1/2001 | Geil |
| 6,198,995 B1 | 3/2001 | Settles et al. |
| 6,241,294 B1 | 6/2001 | Young et al. |
| 6,247,343 B1 | 6/2001 | Weiss et al. |
| 6,256,932 B1 | 7/2001 | Jyawook et al. |
| 6,271,745 B1 | 8/2001 | Anazi et al. |
| 6,341,448 B1 | 1/2002 | Murray |
| 6,361,091 B1 | 3/2002 | Weschler |
| 6,405,485 B1 | 6/2002 | Itami et al. |
| 6,441,512 B1 | 8/2002 | Jakel et al. |
| 6,460,905 B2 | 10/2002 | Suss |
| 6,470,719 B1 | 10/2002 | Franz et al. |
| 6,480,098 B2 | 11/2002 | Flick |
| 6,515,377 B1 | 2/2003 | Uberlein et al. |
| 6,523,376 B2 | 2/2003 | Baukholt et al. |
| 6,550,826 B2 | 4/2003 | Fukushima et al. |
| 6,554,328 B2 | 4/2003 | Cetnar et al. |
| 6,556,900 B1 | 4/2003 | Brynielsson |
| 6,602,077 B2 | 8/2003 | Kasper et al. |
| 6,606,492 B1 | 8/2003 | Losey |
| 6,629,711 B1 | 10/2003 | Gleason et al. |
| 6,639,161 B2 | 10/2003 | Meagher et al. |
| 6,657,537 B1 | 12/2003 | Hauler |
| 6,659,515 B2 | 12/2003 | Raymond et al. |
| 6,701,671 B1 | 3/2004 | Fukumoto et al. |
| 6,712,409 B2 | 3/2004 | Monig |
| 6,715,806 B2 | 4/2004 | Arlt et al. |
| 6,734,578 B2 | 5/2004 | Konno et al. |
| 6,740,834 B2 | 5/2004 | Sueyoshi et al. |
| 6,768,413 B1 | 7/2004 | Kemmann et al. |
| 6,779,372 B2 | 8/2004 | Arlt et al. |
| 6,783,167 B2 | 8/2004 | Bingle et al. |
| 6,786,070 B1 | 9/2004 | Dimig et al. |
| 6,794,837 B1 | 9/2004 | Whinnery et al. |
| 6,825,752 B2 | 11/2004 | Nahata et al. |
| 6,829,357 B1 | 12/2004 | Alrabady et al. |
| 6,843,085 B2 | 1/2005 | Dimig |
| 6,854,870 B2 | 2/2005 | Huizenga |
| 6,879,058 B2 | 4/2005 | Lorenz et al. |
| 6,883,836 B2 | 4/2005 | Breay et al. |
| 6,883,839 B2 | 4/2005 | Belmond et al. |
| 6,914,346 B2 | 7/2005 | Girard |
| 6,923,479 B2 | 8/2005 | Aiyama et al. |
| 6,933,655 B2 | 8/2005 | Morrison et al. |
| 6,948,978 B2 | 9/2005 | Schofield |
| 7,005,959 B2 | 2/2006 | Amagasa |
| 7,038,414 B2 | 5/2006 | Daniels et al. |
| 7,055,997 B2 | 6/2006 | Baek |
| 7,062,945 B2 | 6/2006 | Saitoh et al. |
| 7,070,018 B2 | 7/2006 | Kachouh |
| 7,070,213 B2 | 7/2006 | Willats et al. |
| 7,090,285 B2 | 8/2006 | Markevich et al. |
| 7,091,823 B2 | 8/2006 | Ieda et al. |
| 7,091,836 B2 | 8/2006 | Kachouh et al. |
| 7,097,226 B2 | 8/2006 | Bingle et al. |
| 7,106,171 B1 | 9/2006 | Burgess |
| 7,108,301 B2 | 9/2006 | Louvel |
| 7,126,453 B2 | 10/2006 | Sandau et al. |
| 7,145,436 B2 | 12/2006 | Ichikawa et al. |
| 7,161,152 B2 | 1/2007 | Dipoala |

(56) References Cited

U.S. PATENT DOCUMENTS

| | | |
|---|---|---|
| 7,170,253 B2 | 1/2007 | Spurr et al. |
| 7,173,346 B2 | 2/2007 | Aiyama et al. |
| 7,176,810 B2 | 2/2007 | Inoue |
| 7,180,400 B2 | 2/2007 | Amagasa |
| 7,192,076 B2 | 3/2007 | Ottino |
| 7,204,530 B2 | 4/2007 | Lee |
| 7,205,777 B2 | 4/2007 | Schultz et al. |
| 7,221,255 B2 | 5/2007 | Johnson et al. |
| 7,222,459 B2 | 5/2007 | Taniyama |
| 7,248,955 B2 | 7/2007 | Hein et al. |
| 7,263,416 B2 | 8/2007 | Sakurai et al. |
| 7,270,029 B1 | 9/2007 | Papanikolaou et al. |
| 7,325,843 B2 | 2/2008 | Coleman et al. |
| 7,342,373 B2 | 3/2008 | Newman et al. |
| 7,360,803 B2 | 4/2008 | Parent et al. |
| 7,363,788 B2 | 4/2008 | Dimig et al. |
| 7,375,299 B1 | 5/2008 | Pudney |
| 7,399,010 B2 | 7/2008 | Hunt et al. |
| 7,446,656 B2 | 11/2008 | Steegmann |
| 7,576,631 B1 | 8/2009 | Bingle et al. |
| 7,642,669 B2 | 1/2010 | Spurr |
| 7,686,378 B2 | 3/2010 | Gisler et al. |
| 7,688,179 B2 | 3/2010 | Kurpinski et al. |
| 7,705,722 B2 | 4/2010 | Shoemaker et al. |
| 7,747,286 B2 | 6/2010 | Conforti |
| 7,780,207 B2 | 8/2010 | Gotou et al. |
| 7,791,218 B2 | 9/2010 | Mekky et al. |
| 7,926,385 B2 | 4/2011 | Papanikolaou et al. |
| 7,931,314 B2 | 4/2011 | Nitawaki et al. |
| 7,937,893 B2 | 5/2011 | Pribisic |
| 8,028,375 B2 | 10/2011 | Nakaura et al. |
| 8,093,987 B2 | 1/2012 | Kurpinski et al. |
| 8,126,450 B2 | 2/2012 | Howarter et al. |
| 8,141,296 B2 | 3/2012 | Bern |
| 8,141,916 B2 | 3/2012 | Tomaszewski et al. |
| 8,168,317 B2 | 5/2012 | Lemerand et al. |
| 8,193,462 B2 | 6/2012 | Zanini et al. |
| 8,224,313 B2 | 7/2012 | Howarter et al. |
| 8,376,416 B2 | 2/2013 | Arabia, Jr. et al. |
| 8,398,128 B2 | 3/2013 | Arabia et al. |
| 8,405,515 B2 | 3/2013 | Ishihara et al. |
| 8,419,114 B2 | 4/2013 | Fannon |
| 8,451,087 B2 | 5/2013 | Krishnan et al. |
| 8,454,062 B2 | 6/2013 | Rohlfing et al. |
| 8,474,889 B2 | 7/2013 | Reifenberg et al. |
| 8,532,873 B1 | 9/2013 | Bambenek |
| 8,534,101 B2 | 9/2013 | Mette et al. |
| 8,544,901 B2 | 10/2013 | Krishnan et al. |
| 8,573,657 B2 | 11/2013 | Papanikolaou et al. |
| 8,616,595 B2 | 12/2013 | Wellborn, Sr. et al. |
| 8,648,689 B2 | 2/2014 | Hathaway et al. |
| 8,746,755 B2 | 6/2014 | Papanikolaou et al. |
| 8,826,596 B2 | 9/2014 | Tensing |
| 8,833,811 B2 | 9/2014 | Ishikawa |
| 8,903,605 B2 | 12/2014 | Bambenek |
| 8,915,524 B2 | 12/2014 | Charnesky |
| 8,963,701 B2 | 2/2015 | Rodriguez |
| 8,965,287 B2 | 2/2015 | Lam |
| 9,076,274 B2 | 7/2015 | Kamiya |
| 9,159,219 B2 | 10/2015 | Magner et al. |
| 9,184,777 B2 | 11/2015 | Esselink et al. |
| 9,187,012 B2 | 11/2015 | Sachs et al. |
| 9,189,900 B1 | 11/2015 | Penilla et al. |
| 9,260,882 B2 | 2/2016 | Krishnan et al. |
| 9,284,757 B2 | 3/2016 | Kempel |
| 9,405,120 B2 | 8/2016 | Graf |
| 9,409,579 B2 | 8/2016 | Eichin et al. |
| 9,416,565 B2 | 8/2016 | Papanikolaou et al. |
| 9,518,408 B1 | 12/2016 | Krishnan |
| 9,546,502 B2 | 1/2017 | Lange |
| 9,551,166 B2 | 1/2017 | Patel et al. |
| 9,725,069 B2 | 8/2017 | Krishnan |
| 9,777,528 B2 | 10/2017 | Elie et al. |
| 9,797,178 B2 | 10/2017 | Elie et al. |
| 9,834,964 B2 | 12/2017 | Van Wiemeersch et al. |
| 9,845,071 B1 | 12/2017 | Krishnan |
| 9,903,142 B2 | 2/2018 | Van Wiemeersch et al. |
| 9,909,344 B2 | 3/2018 | Krishnan et al. |
| 9,957,737 B2 | 5/2018 | Patel et al. |
| 2001/0005078 A1 | 6/2001 | Fukushima et al. |
| 2001/0030871 A1 | 10/2001 | Anderson |
| 2002/0000726 A1 | 1/2002 | Zintler |
| 2002/0111844 A1 | 8/2002 | Vanstory et al. |
| 2002/0121967 A1 | 9/2002 | Bowen et al. |
| 2002/0186144 A1 | 12/2002 | Meunier |
| 2003/0009855 A1 | 1/2003 | Budzynski |
| 2003/0025337 A1 | 2/2003 | Suzuki et al. |
| 2003/0038544 A1 | 2/2003 | Spurr |
| 2003/0101781 A1 | 6/2003 | Budzynski et al. |
| 2003/0107473 A1 | 6/2003 | Pang et al. |
| 2003/0111863 A1 | 6/2003 | Weyerstall et al. |
| 2003/0139155 A1 | 7/2003 | Sakai |
| 2003/0172695 A1 | 9/2003 | Buschmann |
| 2003/0182863 A1 | 10/2003 | Mejean et al. |
| 2003/0184098 A1 | 10/2003 | Aiyama |
| 2004/0061462 A1 | 4/2004 | Bent et al. |
| 2004/0093155 A1 | 5/2004 | Simonds et al. |
| 2004/0124708 A1 | 7/2004 | Giehler et al. |
| 2004/0195845 A1 | 10/2004 | Chevalier |
| 2004/0217601 A1 | 11/2004 | Garnault et al. |
| 2005/0057047 A1 | 3/2005 | Kachouh |
| 2005/0068712 A1 | 3/2005 | Schulz et al. |
| 2005/0216133 A1 | 9/2005 | MacDougall et al. |
| 2005/0218913 A1 | 10/2005 | Inaba |
| 2006/0056663 A1 | 3/2006 | Call |
| 2006/0100002 A1 | 5/2006 | Luebke et al. |
| 2006/0186987 A1 | 8/2006 | Wilkins |
| 2006/0232378 A1* | 10/2006 | Ogino .................. B60R 25/246 340/5.62 |
| 2007/0001467 A1 | 1/2007 | Muller et al. |
| 2007/0090654 A1 | 4/2007 | Eaton |
| 2007/0115191 A1 | 5/2007 | Hashiguchi et al. |
| 2007/0120645 A1 | 5/2007 | Nakashima |
| 2007/0126243 A1 | 6/2007 | Papanikolaou et al. |
| 2007/0132553 A1 | 6/2007 | Nakashima |
| 2007/0170727 A1 | 7/2007 | Kohlstrand et al. |
| 2008/0021619 A1 | 1/2008 | Steegmann et al. |
| 2008/0060393 A1 | 3/2008 | Johansson et al. |
| 2008/0068129 A1 | 3/2008 | Ieda et al. |
| 2008/0129446 A1 | 6/2008 | Vader |
| 2008/0143139 A1 | 6/2008 | Bauer et al. |
| 2008/0202912 A1 | 8/2008 | Boddie et al. |
| 2008/0203737 A1 | 8/2008 | Tomaszewski et al. |
| 2008/0211623 A1 | 9/2008 | Scheurich |
| 2008/0217956 A1 | 9/2008 | Gschweng et al. |
| 2008/0224482 A1 | 9/2008 | Cumbo et al. |
| 2008/0230006 A1 | 9/2008 | Kirchoff et al. |
| 2008/0250718 A1 | 10/2008 | Papanikolaou et al. |
| 2008/0296927 A1 | 12/2008 | Gisler et al. |
| 2008/0303291 A1 | 12/2008 | Spurr |
| 2008/0307711 A1 | 12/2008 | Kern et al. |
| 2008/0314097 A1* | 12/2008 | Rohlfing ................ E05B 81/78 70/256 |
| 2009/0021112 A1* | 1/2009 | Kondou .................. E05B 81/78 310/319 |
| 2009/0033104 A1 | 2/2009 | Konchan et al. |
| 2009/0033477 A1 | 2/2009 | Illium et al. |
| 2009/0145181 A1 | 6/2009 | Pecoul et al. |
| 2009/0160211 A1 | 6/2009 | Kirshnan et al. |
| 2009/0177336 A1 | 7/2009 | McClellan et al. |
| 2009/0240400 A1 | 9/2009 | Lachapelle et al. |
| 2009/0257241 A1 | 10/2009 | Meinke et al. |
| 2009/0279826 A1* | 11/2009 | Ieda ..................... B60Q 1/2669 385/13 |
| 2010/0007463 A1 | 1/2010 | Dingman et al. |
| 2010/0005233 A1 | 3/2010 | Arabia et al. |
| 2010/0052337 A1 | 3/2010 | Arabia, Jr. et al. |
| 2010/0060505 A1 | 3/2010 | Witkowski |
| 2010/0097186 A1 | 4/2010 | Wielebski |
| 2010/0175945 A1 | 7/2010 | Helms |
| 2010/0235057 A1 | 9/2010 | Papanikolaou et al. |
| 2010/0235058 A1 | 9/2010 | Papanikolaou et al. |
| 2010/0235059 A1 | 9/2010 | Krishnan et al. |
| 2010/0237635 A1 | 9/2010 | Ieda et al. |

(56) References Cited

U.S. PATENT DOCUMENTS

| | | |
|---|---|---|
| 2010/0253535 A1 | 10/2010 | Thomas |
| 2010/0265034 A1 | 10/2010 | Cap et al. |
| 2010/0315267 A1 | 12/2010 | Chung et al. |
| 2011/0041409 A1 | 2/2011 | Newman et al. |
| 2011/0060480 A1 | 3/2011 | Mottla et al. |
| 2011/0148575 A1* | 6/2011 | Sobecki ............... E05B 85/103 340/5.64 |
| 2011/0154740 A1 | 6/2011 | Matsumoto et al. |
| 2011/0180350 A1 | 7/2011 | Thacker |
| 2011/0203181 A1 | 8/2011 | Magner et al. |
| 2011/0203336 A1 | 8/2011 | Mette et al. |
| 2011/0227351 A1 | 9/2011 | Grosedemouge |
| 2011/0248862 A1 | 10/2011 | Budampati |
| 2011/0252845 A1 | 10/2011 | Webb et al. |
| 2011/0313937 A1 | 12/2011 | Moore, Jr. et al. |
| 2012/0119524 A1 | 5/2012 | Bingle et al. |
| 2012/0154292 A1 | 6/2012 | Zhao et al. |
| 2012/0180394 A1 | 7/2012 | Shinohara |
| 2012/0205925 A1 | 8/2012 | Muller et al. |
| 2012/0228886 A1 | 9/2012 | Muller et al. |
| 2012/0252402 A1 | 10/2012 | Jung |
| 2013/0069761 A1 | 3/2013 | Tieman |
| 2013/0079984 A1 | 3/2013 | Aerts et al. |
| 2013/0104459 A1 | 5/2013 | Patel et al. |
| 2013/0127180 A1 | 5/2013 | Heberer et al. |
| 2013/0138303 A1 | 5/2013 | McKee et al. |
| 2013/0207794 A1 | 8/2013 | Patel |
| 2013/0282226 A1 | 10/2013 | Pollmann |
| 2013/0295913 A1 | 11/2013 | Matthews, III et al. |
| 2013/0311046 A1 | 11/2013 | Heberer et al. |
| 2013/0321065 A1 | 12/2013 | Salter et al. |
| 2013/0325521 A1 | 12/2013 | Jameel |
| 2014/0000165 A1 | 1/2014 | Patel et al. |
| 2014/0007404 A1 | 1/2014 | Krishnan et al. |
| 2014/0015637 A1 | 1/2014 | Dassanakake et al. |
| 2014/0088825 A1 | 3/2014 | Lange et al. |
| 2014/0129113 A1 | 5/2014 | Van Wiemersch et al. |
| 2014/0150581 A1 | 6/2014 | Scheuring et al. |
| 2014/0156111 A1 | 6/2014 | Ehrman |
| 2014/0188999 A1 | 7/2014 | Leonard et al. |
| 2014/0200774 A1 | 7/2014 | Lange et al. |
| 2014/0227980 A1 | 8/2014 | Esselink et al. |
| 2014/0242971 A1 | 8/2014 | Aladenize et al. |
| 2014/0245666 A1 | 9/2014 | Ishida et al. |
| 2014/0256304 A1 | 9/2014 | Frye et al. |
| 2014/0278599 A1 | 9/2014 | Reh |
| 2014/0293753 A1 | 10/2014 | Pearson |
| 2014/0338409 A1 | 11/2014 | Kraus et al. |
| 2014/0347163 A1 | 11/2014 | Banter et al. |
| 2015/0001926 A1 | 1/2015 | Kageyama et al. |
| 2015/0048927 A1 | 2/2015 | Simmons |
| 2015/0059250 A1 | 3/2015 | Miu et al. |
| 2015/0084739 A1 | 3/2015 | Lemoult et al. |
| 2015/0149042 A1 | 5/2015 | Cooper et al. |
| 2015/0161832 A1 | 6/2015 | Esselink et al. |
| 2015/0197205 A1 | 7/2015 | Xiong |
| 2015/0240548 A1 | 8/2015 | Bendel et al. |
| 2015/0294518 A1 | 10/2015 | Peplin |
| 2015/0330112 A1* | 11/2015 | Van Wiemeersch .... E05B 81/76 292/201 |
| 2015/0330113 A1 | 11/2015 | Van Wiemeersch et al. |
| 2015/0330114 A1 | 11/2015 | Linden et al. |
| 2015/0330117 A1 | 11/2015 | Van Wiemeersch et al. |
| 2015/0360545 A1 | 12/2015 | Nanla |
| 2015/0371031 A1 | 12/2015 | Ueno et al. |
| 2016/0060909 A1 | 3/2016 | Krishnan et al. |
| 2016/0130843 A1* | 5/2016 | Bingle ............... E05B 47/0009 292/242 |
| 2016/0138306 A1 | 5/2016 | Krishnan et al. |
| 2016/0153216 A1 | 6/2016 | Funahashi et al. |
| 2016/0326779 A1 | 11/2016 | Papanikolaou et al. |
| 2017/0014039 A1 | 1/2017 | Pahlevan et al. |
| 2017/0074006 A1 | 3/2017 | Patel et al. |
| 2017/0247016 A1 | 8/2017 | Krishnan |
| 2017/0270490 A1 | 9/2017 | Penilla et al. |
| 2017/0306662 A1 | 10/2017 | Och et al. |
| 2017/0349146 A1 | 12/2017 | Krishnan |
| 2018/0038147 A1 | 2/2018 | Linden et al. |
| 2018/0051493 A1 | 2/2018 | Krishnan et al. |
| 2018/0051498 A1 | 2/2018 | Van Wiemeersch et al. |
| 2018/0058128 A1 | 3/2018 | Khan et al. |
| 2018/0065598 A1 | 3/2018 | Krishnan |
| 2018/0080270 A1 | 3/2018 | Khan et al. |
| 2018/0128022 A1 | 5/2018 | Van Wiemeersh et al. |

FOREIGN PATENT DOCUMENTS

| | | |
|---|---|---|
| CN | 101527061 A | 9/2009 |
| CN | 201567872 U | 9/2010 |
| CN | 101932466 A | 12/2010 |
| CN | 201915717 U | 8/2011 |
| CN | 202200933 U | 4/2012 |
| CN | 202686247 U | 1/2013 |
| CN | 103206117 A | 7/2013 |
| CN | 103264667 A | 8/2013 |
| CN | 203511548 U | 4/2014 |
| CN | 204326814 U | 5/2015 |
| DE | 4403655 A1 | 8/1995 |
| DE | 19620059 A1 | 11/1997 |
| DE | 19642698 A1 | 4/1998 |
| DE | 19642698 A2 | 11/2000 |
| DE | 10212794 A1 | 6/2003 |
| DE | 20121915 U1 | 11/2003 |
| DE | 10309821 A1 | 9/2004 |
| DE | 1020050415541 A1 | 3/2007 |
| DE | 102006029774 A1 | 1/2008 |
| DE | 102006041928 A1 | 3/2008 |
| DE | 102010052582 A1 | 5/2012 |
| DE | 102011051165 A1 | 12/2012 |
| DE | 102015101164 A1 | 7/2015 |
| DE | 102014107809 A1 | 12/2015 |
| EP | 0372791 A2 | 6/1990 |
| EP | 0694664 A1 | 1/1996 |
| EP | 1162332 A1 | 12/2001 |
| EP | 1284334 A1 | 2/2003 |
| EP | 1288403 A2 | 3/2003 |
| EP | 1284334 A1 | 9/2003 |
| EP | 1460204 A2 | 9/2004 |
| EP | 1465119 A1 | 10/2004 |
| EP | 1338731 A2 | 1/2005 |
| EP | 1944436 A2 | 7/2008 |
| EP | 2053744 A2 | 4/2009 |
| EP | 2314803 A2 | 4/2011 |
| FR | 2698838 A1 | 6/1994 |
| FR | 2783547 A1 | 3/2000 |
| FR | 2841285 A1 | 12/2003 |
| FR | 2948402 A1 | 7/2009 |
| FR | 2955604 A1 | 7/2011 |
| GB | 2402840 A | 12/2004 |
| GB | 2496754 A | 5/2013 |
| JP | 62255256 A | 11/1987 |
| JP | 05059855 A | 3/1993 |
| JP | 406167156 A | 6/1994 |
| JP | 406185250 A | 7/1994 |
| JP | 2000064685 A | 2/2000 |
| JP | 2000314258 A | 11/2000 |
| JP | 2007138500 A | 6/2007 |
| KR | 20030025738 A | 3/2003 |
| KR | 20120108580 A | 10/2012 |
| WO | 0123695 A1 | 4/2001 |
| WO | 03095776 A1 | 11/2003 |
| WO | 2013111615 A1 | 8/2013 |
| WO | 2013146918 A1 | 10/2013 |
| WO | 2014146186 A1 | 9/2014 |

OTHER PUBLICATIONS

General Motors Corporation, 2006 Chevrolet Corvette Owner Manual, © 2005 General Motors Corporation, 4 pages.
General Motors LLC, 2013 Chevrolet Corvette Owner Manual, 2012, 17 pages.
General Motors, "Getting to Know Your 2014 Corvette," Quick Reference Guide, 2013, 16 pages.

(56) References Cited

OTHER PUBLICATIONS

InterRegs Ltd., Federal Motor Vehicle Safety Standard, "Door Locks and Door Retention Components," 2012, F.R. vol. 36 No. 232—Feb. 12, 1971, 23 pages.
Ross Downing, "How to Enter & Exit a Corvette With a Dead Battery," YouTube video http://www.youtube.com/watch?v=DLDqmGQU6L0, Jun. 6, 2011, 1 page.
Jeff Glucker, "Friends videotape man 'trapped' inside C6 Corette with dead battery," YouTube via Corvett Online video http://www.autoblog.com/2011/05/14/friends-videotape-man-trapped-inside-c6-corvette-with-dead-bat, May 14, 2011, 1 page.
Don Roy "ZR1 Owner Calls 911 After Locking Self in Car," website http://www.corvetteonline.com/news/zr1-owner-calls-911-after-locking-self-in-car/, Apr. 13, 2011, 2 pages.
Zach Bowman, "Corvette with dead battery traps would-be thief," website http://www.autoblog.com/2011/10/25/corvette-with-dead-battery-traps-would-be-thief/, Oct. 25, 2011, 2 pages.
U.S. Appl. No. 14/468,634, filed Aug. 26, 2014, 15 pages.
U.S. Appl. No. 13/608,303, filed Sep. 10, 2012, 15 pages.
U.S. Appl. No. 14/281,998, filed May 20, 2014, 20 pages.
U.S. Appl. No. 14/282,224, filed May 20, 2014, 15 pages.
U.S. Appl. No. 14/276,415, filed May 13, 2014, 18 pages.
Office Action dated Mar. 10, 2017, U.S. Appl. No. 15/174,206, filed Jun. 6, 2016, 17 pages.
Hyundai Bluelink, "Send Directions to your car," Link to App, 2015, 3 pages.
Bryan Laviolette, "GM's New App Turns Smartphones into Virtual Keys," Article, Jul. 22, 2010, 2 pages.
Zipcar.com, "Car Sharing from Zipcar: How Does car Sharing Work?" Feb. 9, 2016, 6 pages.
Department of Transportation, "Federal Motor Vehicle Safety Standards; Door Locks and Door Retention Components and Side Impact Protection," http://www.nhtsa.gov/cars/rules/rulings/DoorLocks/DoorLocks_NPRM.html#VI_C, 23 pages, Aug. 28, 2010.
"Push Button to open your car door" Online video clip. YouTube, Mar. 10, 2010. 1 page.
Car of the Week: 1947 Lincoln convertible by: bearnest May 29, 2012 http://www.oldcarsweekly.com/car-of-the-week/car-of-the-week-1947-lincoln-convertible. 7 pages.
U.S. Appl. No. 14/276,415, Office Action dated Mar. 28, 2018, 19 pages.
U.S. Appl. No. 12/402,744, Office Action dated Oct. 23, 2013, 7 pages.
U.S. Appl. No. 12/402,744, Advisory Action dated Jan. 31, 2014, 2 pages.
U.S. Appl. No. 14/280,035, filed May 16, 2014, entitled "Powered Latch System for Vehicle Doors and Control System Therefor."
U.S. Appl. No. 14/281,998, filed May 20, 2014, entitled "Vehicle Door Handle and Powered Latch System."
U.S. Appl. No. 14/282,224, filed May 20, 2014, entitled "Powered Vehicle Door Latch and Exterior Handle With Sensor."
George Kennedy, "Keyfree app replaces conventional keys with your smart phone," website, Jan. 5, 2015, 2 pages.
Hyundai Motor India Limited, "Hyundai Care," website, Dec. 8, 2015, 3 pages.
Keyfree Technologies Inc., "Keyfree," website, Jan. 10, 2014, 2 pages.
PRWeb, "Keyfree Technologies Inc. Launches the First Digital Car Key," Jan. 9, 2014, 3 pages.

\* cited by examiner

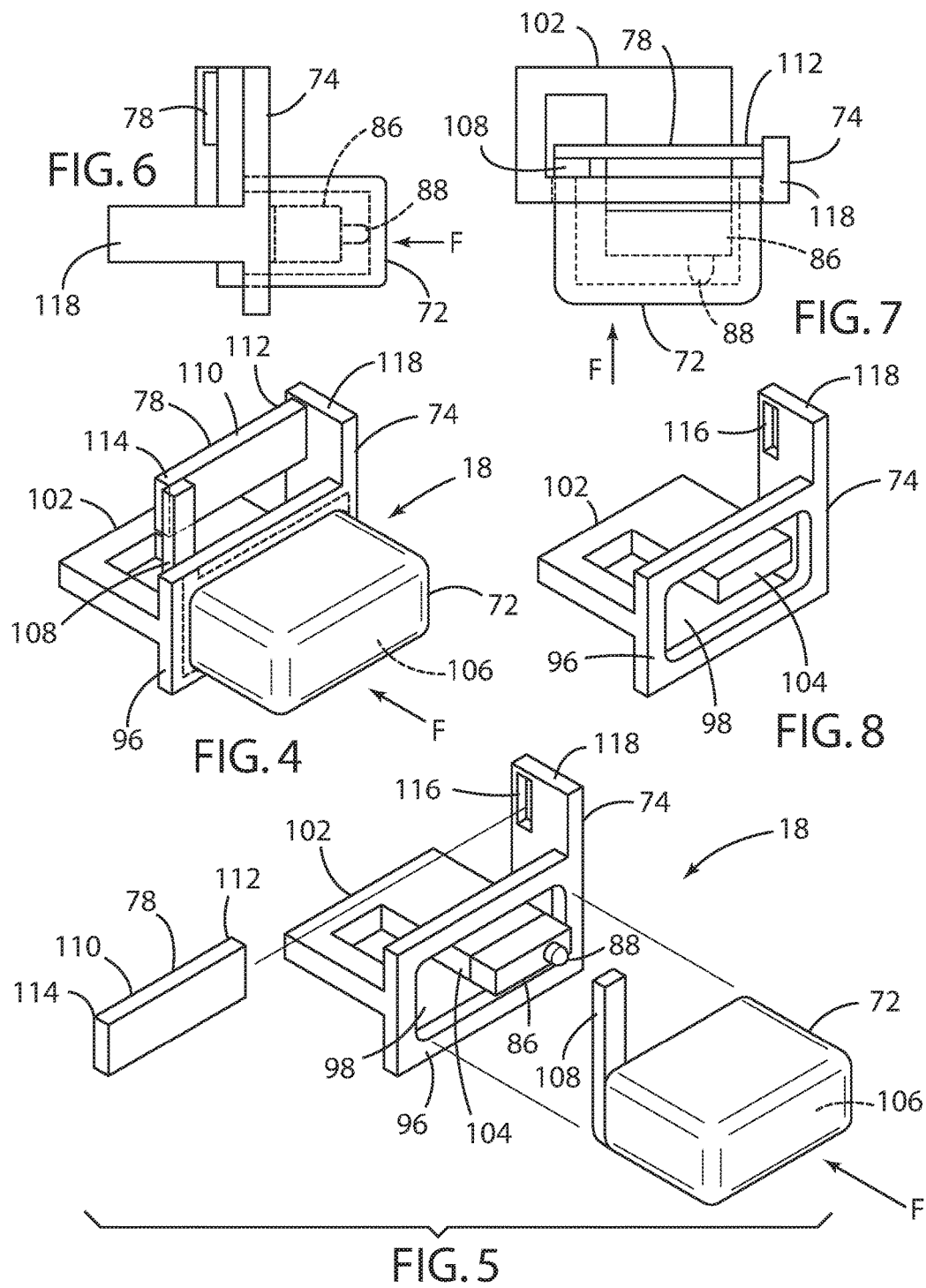

PIEZO BASED ENERGY HARVESTING FOR E-LATCH SYSTEMS

CROSS-REFERENCE TO RELATED APPLICATIONS

This application is a continuation of U.S. patent application Ser. No. 14/086,582, filed Nov. 21, 2013, and entitled "PIEZO BASED ENERGY HARVESTING FOR E-LATCH SYSTEMS," now U.S. Pat. No. 9,416,565, issued on Aug. 16, 2016, the entire disclosure of which is incorporated herein by reference.

FIELD OF THE INVENTION

The present invention generally relates to powered latch releases for vehicle doors, hatches, hoods, and the like.

BACKGROUND OF THE INVENTION

Various types of powered door latch systems have been developed. An example of one such arrangement is disclosed in U.S. Pat. No. 9,260,882, entitled "UNIVERSAL GLOBAL LATCH SYSTEM," issued on Feb. 16, 2016, the entire contents of which are hereby incorporated by reference. Powered door latches may include a powered actuator that shifts the pawl of the latch to thereby shift the latch to an unlatched state. Once the pawl is in the released position, the latch retaining member (or "catch") can be rotated such that the vehicle door can be opened. Powered latch systems may also include an electrical switch or other unlatch input device at the exterior door handle and/or the interior door handle. In use, a user actuates the switch, thereby generating a signal that is received by a controller. The controller evaluates the signal and generates a signal that causes the powered actuator to shift the pawl to a released position if predefined door unlatch criteria are met, thereby unlatching the powered latch.

Powered latches may utilize a solenoid, electric motor, or other suitable electrically-powered actuator to shift the pawl. The electrically powered actuators are typically powered utilizing the vehicle's main electrical power supply (e.g. a battery). However, electrical energy storage devices such as batteries, capacitors, etc. tend to lose their electrical charge over a period of time. Also, in the event of a malfunction, the vehicle's main electrical power supply may be lost. In the event electrical power is lost, it may not be possible to actuate an electrically-powered latch device.

SUMMARY OF THE INVENTION

One aspect of the present invention is a vehicle door including an electrically-powered latch defining latched and unlatched configurations. The system includes a user input feature that can be actuated by a user to cause the electrically-powered latch assembly to change from the latched state or configuration to the unlatched state or configuration. When the latch is in the unlatched configuration, the door can be opened upon application of a force to the door by a user. The system includes an electrical energy storage device that is operably connected to the electrically-powered latch, and a piezoelectric device. The piezoelectric device is operably connected to the electrical energy storage device such that the piezoelectric device can be manually actuated by a user to charge the electrical energy storage device. Electrical energy from the electrical energy storage device can be utilized to actuate the electrically-powered latch to thereby unlatch the latch assembly. The user input feature may comprise a switch or sensor mounted on or adjacent an interior door handle/latch release, or it may comprise a switch or sensor positioned on or adjacent an exterior door handle. The electrical energy storage device may comprise an emergency battery, capacitor, or other electrical device capable of storing sufficient electrical energy to power the electrically-powered latch. The piezoelectric device may include a bendable beam element or member that generates electrical energy as the beam flexes/bends. The switch may be configured such that a user can simultaneously actuate the switch and bend the piezoelectric element.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is an isometric view of an interior latch release including a piezoelectric device;

FIG. 5 is an exploded perspective view of the assembly of FIG. 4;

FIG. 6 is a side view of the assembly of FIG. 4;

FIG. 7 is a top plan view of the assembly of FIG. 4; and

FIG. 8 is an isometric view of a base/bezel of the assembly of FIG. 4.

DETAILED DESCRIPTION OF THE PREFERRED EMBODIMENTS

Figure 1:
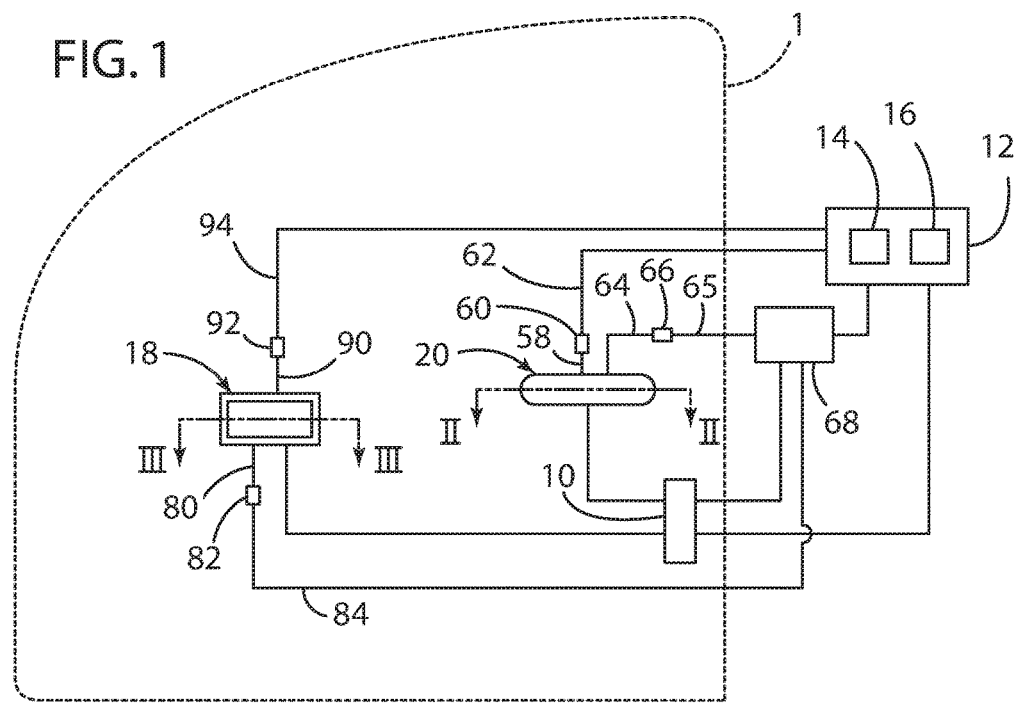
FIG. 1 is a partially schematic view of a door having one or more piezoelectric devices that provide electrical power to actuate an electrically powered latch device.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a vehicle door 1 includes a powered latch device 10 that is operably connected to a power/control unit or system 12 of a motor vehicle. The power/control system 12 may include a controller 14 and an electrical power supply such as a battery 16. The door 1 also includes an inside release/handle assembly 18, and an outside release/handle assembly 20. The inside handle assembly 18 and outside handle assembly 20 are both operably connected to the power/control system 12.

As described in more detail in U.S. Pat. No. 9,260,882, powered latch 10 may include a movable catch member and a pawl that selectively engages the catch member to retain the catch member in a closed position. The door 1 cannot be opened if the powered latch 10 is in a latched configuration or state. A powered actuator such as an electric motor or solenoid can be utilized to shift the pawl between an engaged position wherein the powered latch 10 remains in the latched position, and a released positioned wherein the powered latch 10 is in an unlatched configuration.

Figure 2:
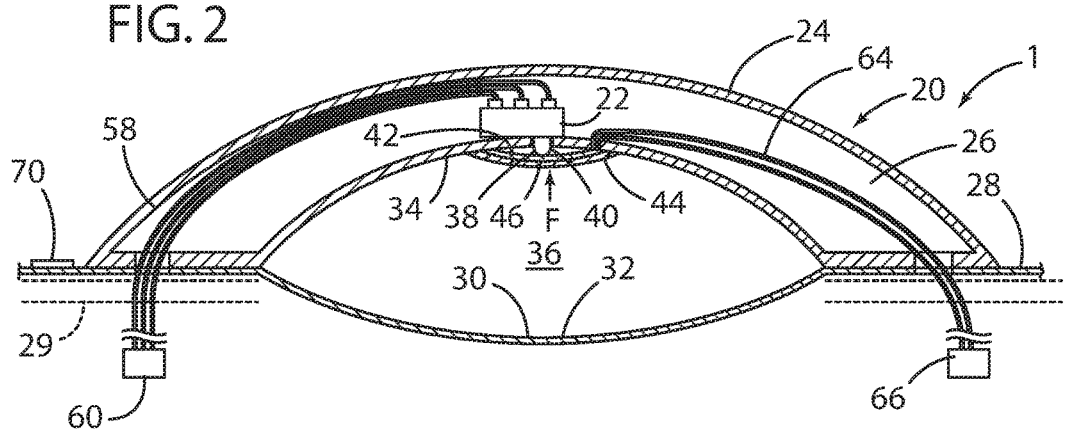
FIG. 2 is a partially fragmentary cross sectional view taken along the line II-II, FIG. 1.

With further reference to FIG. 2, outside handle assembly 20 includes a handle member 24 having a generally tubular construction forming an interior space 26. The handle member 24 is mounted to outer layer or skin 28 and/or inner door structure 29 of door 1. The door skin 28 may include a recessed area 30 having an outer surface 32 that generally faces an inner surface 34 of handle member 24. In use, a user's hand can be inserted into the space 36 defined between the outer surface 32 of skin 28 and inner surface 34 of handle member 24.

Figure 2A:
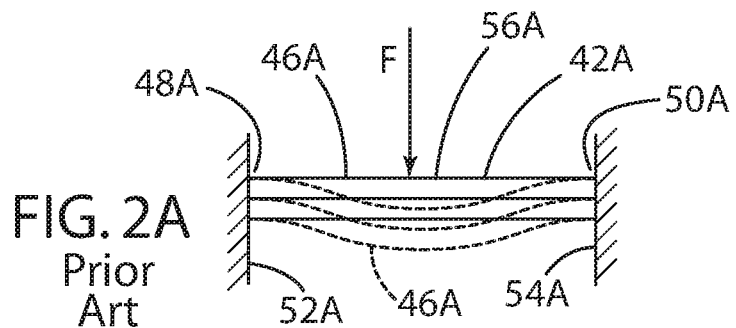
FIG. 2A is a schematic view of a piezoelectric device having a bendable beam element having opposite ends that are rigidly fixed.
Figure 2B:
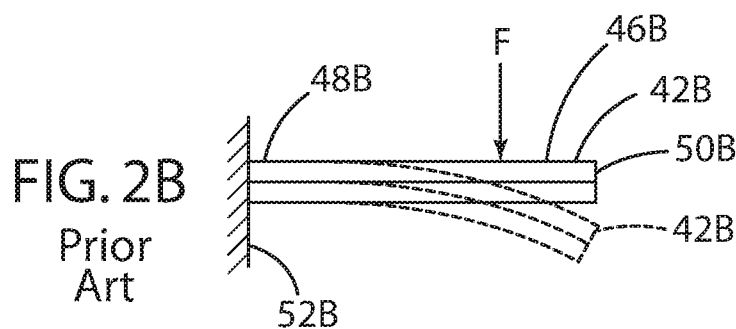
FIG. 2B is a schematic view of a piezoelectric device having a bendable beam element having a first end that is fixed to a rigid support, and a second end that is not constrained.

A user input feature such as a switch 22 is mounted to the handle member 24. The switch 22 includes a movable switch member such as plunger 38 which extends through an opening 40 in handle member 24. A piezoelectric device 42 is mounted to the handle member 24, and an elastomeric membrane 44 extends over the piezoelectric device 42. The piezoelectric device 42 may comprise a beam-type piezoelectric device 42A (FIG. 2A) or a beam-type device 42B (FIG. 2B). Device 42A includes a bendable element 46A having first and second ends 48A and 50A that are rigidly fixed to bases 52A and 54A, respectively. Application of a force "F" to a central portion 56A of bendable element 46A causes the bendable element 46A to flex and thereby generate electricity in a known manner. Alternatively, with reference to FIG. 2B the piezoelectric device 42 may comprise a cantilevered piezoelectric device having a bendable element 46B having a first end 48B that is fixed to a support or base 52B. Application of a force "F" causes the bendable element 46B to bend, thereby generating electricity in a known manner. Suitable piezoelectric devices as shown in FIGS. 2A and 2B are commercially available, and the details of the piezoelectric device are therefore not described in detail herein. It will be understood that the piezoelectric device 42 is shown schematically in FIG. 2, and the specific mounting structures (e.g. bases 52A, 52B and/or 54A) are not shown in detail.

Referring again to FIG. 2, wires or lines 58 are operably connected to the switch 22. A connector such as plug 60 may be utilized to operably connect the lines 58 to lines 62 (FIG. 1) to thereby operably connect the switch 22 to the controller 14. Lines 64 are connected to piezoelectric device 42, and include a connector such as plug 66 (FIG. 1) that connects to lines 65 to thereby operably connect the piezoelectric device 42 to a backup electrical energy storage device 68 (FIG. 1). The backup electrical energy storage device 68 may comprise a battery, capacitor, or other suitable device capable of storing sufficient electrical energy to actuate the powered latch 10.

If the main power supply or battery 16 (FIG. 1) is functioning properly, a user can open the door 1 from the outside by pressing on membrane 44 (FIG. 2) to thereby move the movable switch member 38 of switch 22 to thereby generate a signal to the controller 14 (FIG. 1). The controller 14 then generates a signal causing the powered latch 10 to actuate and shift to an unlatched state or condition utilizing electrical power from battery 16. Controller 14 may be programmed to generate a signal to unlatch the powered latch 10 only if certain predefined criteria are met. For example, controller 14 may cause powered latch 10 to unlatch only if the controller 14 receives a signal from switch 22 and also receives an authorization signal from a remote security device (not shown) such as a fob or the like to thereby prevent unauthorized entry.

In the event the main battery 16 of the vehicle loses its charge or is otherwise unable to supply power to actuate the powered latch 10, a user can actuate the piezoelectric device 42 to generate electricity that is transferred to the backup electrical energy storage device 68. Controller 14 may be configured to detect the charge/electrical power available from main power supply 16 and backup electrical energy storage device 68. As shown in FIG. 2, the bendable element 46 of the piezoelectric device 42 preferably overlies the movable switch member 38, such that application of a force F to membrane 44 by a user will simultaneously flex the bendable element 46 and actuate the switch 22 by movement of movable switch member 38. If the main vehicle power 16 has failed, a user can repeatedly push on the membrane 44 to flex the bendable piezoelectric element 46 a number of times as required to charge the backup electrical energy storage device 68. The door 1 may include one or more indicators 70 positioned on the handle member 24 or adjacent the handle 24 in a position that is visible to a user standing directly adjacent the door 1. For example, indicators 70 may be located in door trim or the like (not shown) or on the exterior of door 1 or on other exterior vehicle surfaces. The indicator 70 may comprise one or more LEDs or the like that are operably connected to controller 14. Controller 14 may be configured to cause indicator 70 to flash or otherwise provide a signal to the user indicating that the main battery 16 is not supplying adequate electrical power, such that manual charging is required. During operation, repeated flexing of bendable piezoelectric element 46 by the user eventually charges the backup electrical energy storage device 68 sufficiently to actuate the powered latch 10. Once the controller 14 determines that backup electrical energy storage device 68 has sufficient electrical energy, controller 14 generates a signal causing the powered latch to unlatch powered latch 10 upon actuation of switch 22.

In the illustrated example, approximately 1 Joule (J) of energy is required to actuate electrically powered latch 10. Commercially available piezoelectric devices (FIGS. 2A and 2B) are capable of generating about 0.055 J of energy per activation. Thus, fewer than 20 activations of the piezoelectric device 42 are typically required to charge backup electrical energy storage device 42.

Figure 3:
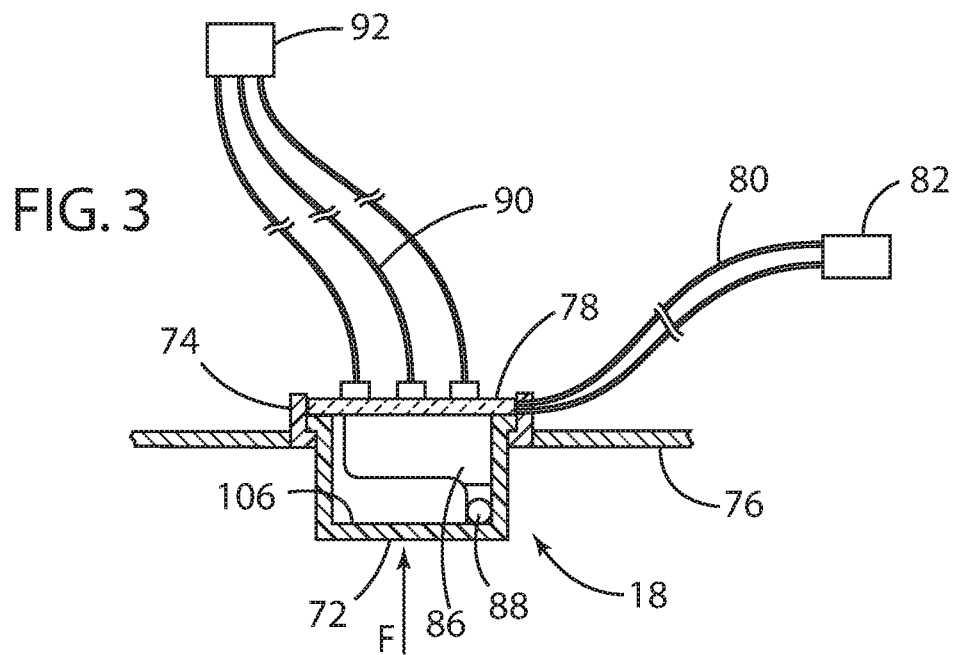
FIG. 3 is a partially fragmentary cross sectional view taken along the line FIG. 1.

With further reference to FIG. 3, the inside release or handle assembly 18 includes an actuating member 72 that is movably supported by a bezel or base 74. The bezel or base 74 is mounted to an interior door structure 76. As discussed in more detail below, a piezoelectric device 78 is mounted to the base 74, such that movement of actuating member 72 causes piezoelectric device 78 to generate electricity. The electricity is transferred through electrical lines 80, connector 82, and lines 84 (see also FIG. 1) to the backup electrical energy storage device 68. Movement of actuating member 72 also causes movement of movable switch member 88 of switch 86. Switch 86 is operably connected to controller 14 by lines 90, connector 92, and lines 94 (see also FIG. 1).

With further reference to FIGS. 4-8, base 74 includes a frame portion 96 with an opening 98 that movably receives the actuating member 72. The base 74 also includes an inner support structure 102 having an end portion 104. The switch 86 is mounted to the end portion 104 of inner support structure 102 when assembled such that inner surface 106 (see also FIG. 3) of actuating member 72 is disposed directly adjacent movable switch member 88 of switch 86.

The piezoelectric device 78 includes a flexible piezoelectric beam element 110 having a first end 112 that is received in a cavity 116 of support structure 118 of base 74 to thereby fix the first end 112 of flexible piezoelectric beam element 110 to the base 74. Piezoelectric device 78 may be substantially similar to device 42B (FIG. 2B). When assembled, the outer or second end 114 of flexible piezoelectric beam element 110 is positioned directly adjacent an extension 108 of actuating member 72. In use, a user applies a force "F" on actuating member 72, thereby shifting the actuating member 72 inwardly in the direction of the arrow "F." As the actuating member 72 moves inwardly, inner surface 106 of actuating member 72 causes movable switch member 88 of switch 86 to move, and also causes extension 108 of actuating member 72 to push against end 114 of flexible piezoelectric beam element 110. As actuating member 72 moves inwardly, it therefore flexes piezoelectric beam element 110, causing piezoelectric device 78 to generate electricity, while simultaneously actuating switch 86.

Piezoelectric device 78 may also comprise a device 42A (FIG. 2A) wherein both ends of the beam element are fixed. In this case, base 74 includes a second support structure 118 (now shown) to fixedly support end 114 of beam element 110, and extension 108 of actuating member 72 is positioned adjacent a center portion of beam element 110.

In the event the main battery supply 16 is inoperative, the inside release assembly 18 can be utilized to generate electrical energy that is temporarily stored in backup electrical energy storage device 68 to thereby provide for powered actuation of powered latch 10. Specifically, if the main battery supply 16 is inoperative, a user can apply a force F to actuating member 72 to thereby shift the actuating member 72 in the direction of the arrow F. Movement of actuating member 72 shifts the moveable switch member 88 of switch 86, and also flexes piezoelectric beam element 110 of piezoelectric device 78. A user can press the actuating member 72 repeatedly until backup electrical energy storage device 68 has sufficient electrical power to actuate the electrically-powered latch 10. In general, the piezoelectric device 78 may be configured such that 20 or fewer actuations by a user are required to generate sufficient electrical energy to actuate the electrically-powered latch 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle door, comprising:
a door structure having an outer surface;
a handle fixed to the door structure and defining a space between an inner side of the handle and the outer surface;
an electrically-powered latch defining latched and unlatched states;
a user input feature comprising a switch actuated by a user and causing the electrically-powered latch assembly to change from the latched state to the unlatched state in order to unlatch the door such that the door can be unlatched without movement of the handle relative to the door structure, wherein the switch includes a movable switch member;
an electrical energy storage device that is operably connected to the electrically-powered latch;
a piezoelectric device on the inner side of the handle and operably connected to the electrical energy storage device such that the piezoelectric device is configured to be manually actuated by a hand of a user inserted into the space between the inner side of the handle and the outer surface of the door structure to charge the electrical energy storage device, wherein the piezoelectric device includes a bendable piezoelectric element that generates electrical energy upon bending, whereby the bendable piezoelectric element contacts the movable switch member and actuates the switch upon bending of the bendable piezoelectric element; and
wherein:
electrical energy from the electrical energy storage device is utilized to actuate the electrically-powered latch to thereby unlatch the electronically-powered latch without movement of the handle relative to the door structure.

2. The vehicle door of claim 1, wherein:
the sensor comprises a switch that is mounted to the vehicle door.

3. The vehicle door of claim 2, wherein:
the switch is mounted on the exterior side of the door.

4. A vehicle door, comprising:
a door structure;
a handle fixed to the door structure;
an electrically-powered latch defining latched and unlatched states;
a user input feature comprising a sensor actuated by a user and causing the electrically-powered latch assembly to change from the latched state to the unlatched state in order to unlatch the door such that the door can be unlatched without movement of the handle relative to the door structure;
an electrical energy storage device that is operably connected to the electrically-powered latch;
a piezoelectric device operably connected to the electrical energy storage device such that the piezoelectric device is manually actuated by a user to charge the electrical energy storage device;
wherein electrical energy from the electrical energy storage device is utilized to actuate the electrically-powered latch to thereby unlatch the electronically-powered latch without movement of the handle relative to the door structure; and including:
an interior latch release including an interior piezoelectric device that can be manually actuated by a user from inside the vehicle to generate electrical power to actuate the electrically-powered latch to unlatch the door, and an interior sensor that can be actuated from inside the vehicle to unlatch the electrically-powered latch.

5. A vehicle door, comprising:
a door structure;
a base mounted to an interior side of the vehicle door;
a handle fixed to the door structure;
an electrically-powered latch defining latched and unlatched states;
a user input feature comprising a switch actuated by a user and causing the electrically-powered latch assembly to change from the latched state to the unlatched state in order to unlatch the door such that the door can be unlatched without movement of the handle relative to the door structure, wherein the switch includes a movable switch member;

an electrical energy storage device that is operably connected to the electrically-powered latch, wherein the piezoelectric device includes a bendable element that generates electrical energy upon bending, and wherein the bendable element comprises a piezoelectric beam having a first end that is fixed to the base;

a piezoelectric device operably connected to the electrical energy storage device such that the piezoelectric device is manually actuated by a user to charge the electrical energy storage device;

wherein electrical energy from the electrical energy storage device is utilized to actuate the electrically-powered latch to thereby unlatch the electronically-powered latch without movement of the handle relative to the door structure;

an actuating member movably mounted to the interior side of the vehicle door and movably engaging the base; wherein the sensor comprises a switch mounted on the interior side of the door; and wherein:

the piezoelectric device is configured to be manually actuated by movement of the actuating member, and wherein upon movement of the actuating member, the actuating member engages and bends the bendable element and also engages and moves the movable switch member.

6. A vehicle door, comprising:

a door structure having an exterior surface;

an exterior door handle having an inside surface that faces the exterior surface of the door structure;

a controller;

an electrically-powered latch including a movable catch member and a pawl that selectively engages the catch member in a closed position, and an electrically powered actuator that, upon receiving a signal from the controller, shifts the pawl between an engaged position wherein the electrically-powered latch remains in the latched position, and a released position wherein the electrically powered latch is in an unlatched configuration, a piezoelectric device positioned on the inside surface of the exterior door handle, the piezoelectric device having a base and a piezoelectric element, a first portion fixed to the base and a second portion that moves relative to the first portion end when a force is applied to the piezoelectric element, wherein the piezoelectric element comprises a bendable piezoelectric element including an end that moves relative to the base;

a sensor positioned on the inside surface of the exterior door handle and operably connected to the controller, the controller generating an unlatch signal that unlatches an electrically-powered latch without movement of the exterior door handle upon actuation of the sensor, wherein the sensor includes a movable switch member; and wherein:

the piezoelectric device is configured to generate electrical power that is utilized to power the electrically-powered latch, and the bendable piezoelectric element engages and moves the movable switch member upon bending of the bendable piezoelectric element.

7. An electrically-powered latch system for vehicle doors, the electrically-powered latch system comprising:

a controller;

an electrically-powered latch including a movable catch member and a pawl that selectively engages the catch member in a closed position, and an electrically powered actuator that, upon receiving a signal from the controller, shifts the pawl between an engaged position wherein the electrically-powered latch remains in the latched position, and a released position wherein the electrically powered latch is in an unlatched configuration, a piezoelectric device having a base and a piezoelectric element, a first portion fixed to the base and a second portion that moves relative to the first portion end when a force is applied to the piezoelectric element;

a sensor operably connected to the controller, the controller generating an unlatch signal that unlatches an electrically-powered latch without movement of a door handle upon actuation of the sensor;

wherein the piezoelectric device is configured to generate electrical power that is utilized to power the electrically-powered latch; and wherein:

the vehicle door includes a movable actuating member that is configured to operably engage the first portion of the piezoelectric element and apply a force to the first portion of the piezoelectric element whereby a user can manually move the movable actuating member and cause the piezoelectric element to generate electrical power.

8. A vehicle door comprising:

a door structure and a handle mounted thereto and defining space therebetween;

an electrically-powered latch;

a controller;

a sensor;

primary and secondary batteries;

a piezoelectric element adjacent the sensor on the handle facing the space;

wherein the controller is operably connected to the sensor, the primary and secondary batteries, the electrically-powered latch, and the piezoelectric element;

a movable actuating member that engages the piezoelectric element to generate electrical energy that charges the secondary battery, whereby the controller unlatches the electrically-powered latch in response to actuation of the sensor-, and wherein:

the vehicle door includes an illuminated indicator adjacent the actuating member, and wherein the controller causes the illuminated indicator to generate a visible signal if the piezoelectric element needs to be actuated to charge the secondary battery due to a failure of the primary battery.

9. The vehicle door of claim 8, wherein:

the vehicle door defines an outer side and an inner side;

the sensor and the piezoelectric element are disposed on the inner side of the vehicle door.

10. The vehicle door of claim 9, wherein:

the piezoelectric element is bendable;

the sensor comprises a switch;

the vehicle door includes a base and an actuating member movably engaging the base for reciprocating movement whereby reciprocating movement of the actuating member actuates the switch and bends the bendable piezoelectric element.

11. The vehicle door of claim 10, wherein:

the bendable piezoelectric element has a first end that is rigidly mounted to the base, and a second end that is substantially free, and wherein the actuating member engages the bendable piezoelectric element adjacent the second end.

* * * * *